3,405,248
CORE WIRE FOR ELECTRIC ARC WELDING
Wilhelmus Gerardus Essers, Johannes Gerardus Verhagen, and Gerrit Willem Tichelaar, Emmasingel, Eindhoven, Netherlands, assignors to North American Philips Company, Inc., New York, N.Y., a corporation of Delaware
No Drawing. Filed May 20, 1965, Ser. No. 457,471
Claims priority, application Netherlands, May 22, 1964, 6405698
9 Claims. (Cl. 219—146)

ABSTRACT OF THE DISCLOSURE

Welding electrode and process for welding iron under a protective gas atmosphere. The electrode being in the shape of an iron containing cored wire containing in the core a slag-forming mineral constituent containing titanium dioxide and silicon dioxide in the ratio of 10:1 to 1:1.5 by weight. The combined total content of the titanium dioxide and the silicon dioxide being at least 3.5% by weight of the electrode and the maximum content of the mineral constituent being 9% by weight of the electrode.

---

The invention relates to an electrode for electric arc welding in an atmosphere of a protective gas and to a method of electric arc welding with the use of such an electrode.

A method of electric arc welding of iron work pieces with the use of a protective gas is known. In this method the welding electrode consists of a tubular casing consisting essentially of iron with a core consisting of a non-hygroscopic, substantially hydrogen-free slag forming material, a deoxidizing material, and if desired, iron powder and/or alloying elements. In this method titanium dioxide may be used as a slag forming material.

A similar electrode is also described in which the core substantially consists of prefused titanium dioxide, silicon dioxide and manganese oxide as slag-forming elements in such quantities that these elements constitute more than approximately 14% by weight of the electrode.

The use of such large quantities of slag-forming elements involves drawbacks, among which is an adverse influence on the welding efficiency. Thus when the known core electrodes are used, often poor quality welds are obtained. In addition, these known electrodes are unsuitable for making fillet welds in the horizontal-vertical position. The same holds in particular for making welds in the overhead position, for example, fillet welds.

Now according to the invention a new iron core wire welding electrode is produced for electric arc welding with the use of a protective gas of iron workpieces in which said drawbacks do not occur.

In the new welding electrode of the invention, the core contains a constituent which consists of substances which are suitable for the formation of slag which covers the molten welding metal as a coherent layer and can easily be removed after cooling. This constituent will hereinafter be referred to as the mineral constituent of the core. It always contains titanium dioxide and silicon dioxide and may also contain alkali metal oxide and/or aluminium oxide or compounds which are composed of two or more of the said oxides.

More particularly the invention relates to a welding electrode consisting essentially of iron, in the form of a core wire, for the electric arc welding in a protective gas of iron workpieces. The electrode contains manganese and at least one other strongly reducing metal and/or silicon. The core of the electrode contains a titanium dioxide- and silicon dioxide-containing mineral constituent, and it is characterized in that the ratio of the quantities by weight of titanium dioxide and silicon dioxide present in the mineral constituent of the core is equal to or lies between 10:1 and 1:1.5, the quantity by weight of titanium dioxide and that of silicon dioxide together constituting at least 3.5% by weight and the mineral constituent of the core constituting at most 9% by weight of the welding electrode, and to a method of electric arc welding with the use of such an electrode.

The casing of the welding electrode consists essentially of iron and may consist, for example, of soft steel or of an alloyed steel, for example, 18–8 chrome-nickel steel.

The casing may have different shapes, for example, it may be cylindrical or it may have a rectangular cross-section. The casing can be obtained, for example, according to a method known per se by wrapping a strip. In the wrapping process the material of the core may be incorporated in the wire.

The welding electrode according to the invention is particularly useful in the form of an endless core wire for automatic or semi-automatic welding.

The reducing elements employed in the welding electrode, manganese and silicon, and, if desired, other elements, for example, titanium or zirconium, instead of silicon, may be present in the casing in the core or be distributed between the core and casing. Usually the latter will be the case. In this manner the quantity of reducing elements required can easily be adapted to the requirement for welding a particular work piece. Alloying elements which are to be incorporated in the electrode to adapt the composition of the electrode to that of the workpiece may also be distributed in the same manner as the reducing element.

For welding iron workpieces, for example, consisting of steel which is not completely deoxidized, the welding electrode should contain at least 0.3 and at most 2.5% by weight of manganese and at least 0.3 and at most 1.5% by weight of silicon. Silicon may be replaced wholly or partially by titanium. For example, 1.6% by weight of manganese and 0.8% by weight of silicon is used. These elements may be suitably applied in the form of ferro alloys or as silicon manganese.

The core of the welding electrode according to the invention may contain, in addition to the mineral constituent, iron powder (or a powder of another metal or of a mixture of metals) up to approximately 95% by weight of the core, and if desired alloying constituents, for example, nickel or chromium, or, for example, a powder of an alloy steel, for example 18–8 chrome-nickel steel.

The choice of the ratio of the respective masses of casing and core is comparatively arbitrary. For practical purposes, the wall thickness of the casing will invariably be chosen to be so that a wire of sufficient strength is obtained.

In the method according to the invention carbon dioxide will preferably be used as the protective gas. Alternatively, carbon dioxide containing mixtures and, for example, a mixture of 95% by volume of carbon dioxide and 5% by volume of oxygen, a mixture of 85% by volume of argon and 15% by volume of carbon dioxide, or a mixture of 80% by volume of argon, 15% by volume of carbon dioxide and 5% by volume of oxygen may be used.

The welding electrode according to the invention is particularly suitable for welding workpieces of steel which is not completely deoxidized with the use of a carbon dioxide-containing protective gas and in particular of a protective gas consisting substantially entirely of carbon dioxide.

Good results are obtained in particular with electrodes in which the ratio of the quantities by weight of titanium dioxide and silicon dioxide is substantially equal to or lies between 5:1 and 1:1.5 and in particular with electrodes in which this ratio is substantially equal to or lies between 2:1 and 1:1. This holds in particular for electrodes in which the mineral constituent of the core constitutes 5–8% by weight and more in particular in which this constituent is approximately 5% by weight of the whole electrode. By employing such electrodes, which contain, for example, 1.6% by weight of manganese and 0.8% by weight of silicon, particularly fine welds with smooth, even appearance can be obtained on workpieces of, for example, non-alloyed steel or low-alloyed steel, and using carbon dioxide as the protective gas, even in the case of upward welding in the vertical position. Very good fillet welds, also when making welds in the overhead position, can be obtained with such electrodes. The slag can very readily be removed; usually, the slag already releases on cooling. The point where the weld joins the workpiece is smooth.

It has been found that what was said in the preceding paragraph holds in particular for electrodes according to the invention in which the mineral constituent of the core also contains potassium oxide or potassium oxide and aluminium oxide and in particular if these oxides and part of the silicon dioxide are used in the form of potash feldspar ($K_2O \cdot Al_2O_3 \cdot 6SiO_2$). In this case the quantities by weight of the oxides are preferably chosen to be such that the ratio of that of silicon dioxide to that of potassium oxide or to that of this oxide and aluminium oxide together exceeds 2.3. The presence of potassium in the electrode greatly improves the welding properties in D.C. welding in that a more continuous arc is obtained, in that finer droplets are transferred through the arc and in that less spatter occurs.

Instead of potassium oxide alternatively another alkali oxide, for example, sodium oxide may be used.

The oxides to be used, and in particular the alkali oxides, will preferably be used in the form of compounds which are not hygroscopic. For this reason also, potash feldspar is to be preferred.

When using alkali oxides in the form of compounds which are more or less hygroscopic, adequate measures will have to be taken during the manufacture of welding electrodes according to the invention to avoid moisture penetrating into the core. For example, alkali oxide may be used in a combined form as carbonates, silicates, titanates or aluminates of potassium, sodium or cesium. When using a titanate, part of the titanium dioxide may be used in a bound form; the same holds for silicon dioxide and aluminium oxide respectively when using silicates and aluminates respectively. This should be taken into account when dosing the free oxides.

In order that the invention may readily be carried into effect, it will now be described in greater detail, by way of example, with reference to the following specific examples.

The table shows the composition of the mineral constituent of the core for a number of tested electrodes according to the invention. The quantities of the various oxides are in percent, by weight of the welding electrode in question. The same holds for the iron (as powder), manganese and silicon present in the material of the core. Manganese was added as silicomanganese, silicon as ferrosilicon. The thickness of the metal casings varied from 0.2 to 0.35 mm.

In experiments 1 to 5 inclusive titanium dioxide and silicon dioxide only were used as slag-forming constituents; in experiments 6 to 8 inclusively and 20 to 22 inclusively potassium oxide, aluminimum oxide and part of the silicon oxide were added as potash feldspar. In experiment 19 sodium oxide, aluminium, oxide and part of the silicon oxide was added as soda feldspar (0.5% by weight). In experiment 22 the core contained 0.35% by weight of titanium. In experiment 24 the core contained 18–8 chrome-nickel-steel (26% by weight of the electrode) instead of iron powder. In this latter experiment the content of manganese and silicon was adapted to the 18–8 chrome-nickel-steel to be welded. The casing of the welding wires consisted of a soft steel containing 0.23% by weight of Mn, less than 0.1% by weight of Si and less than 0.1% by weight of C. In experiments 1 to 23 inclusively welding was performed on workpieces consisting of semi-killed martin steel (steel Qmc 37; 0.5% by weight of Mn, 0.05% by weight of Si and 0.10% by weight of C). In experiments 13, 20 and 21 welding was also carried out on workpieces consisting of killed martin steel (steel LQmc 52; 1.4% by weight of Mn, 0.5% by weight of Si, 0.2% by weight of C). In experiments 20 and 21 welding was performed in addition on workpieces consisting of another killed martin steel (steel Qmc 41; 1.2% by weight of Mn, 0.07% by weight of Si, 0.12% by weight of C). In experiment 24 welding was performed on workpieces consisting of chrome-nickel-steel (18% of Cr, 8% of Ni).

The experiments were carried out with welding electrodes of 1.2 and 1.8 mm. diameter. In experiments 1 to 24 inclusively welding was performed with an electrode diameter of 1.8 mm. with 360 A direct current (electrode as the positive pole); in experiment 11 welding was also performed with the electrode as the negative pole. In experiments 11, 14, 16 and 17 (electrode diameter 1.8 mm.) welding was also performed with 360 A alternating current. In experiment 5 (electrode diameter 1.8 mm.) welding was also performed with 260 A direct current (electrode as the positive pole); in experiments 9 and 18 electrode diameter 1.2 mm.) welding was also performed with 200 A direct current (electrode as the positive pole). Fillet welds in the horizontal position and upward welding in the vertical position were mainly made. In experiments 1 to 24 inclusive carbon dioxide was used as the protective gas (the quantity of gas varied from 10 to 20 litres per minute). With electrodes of experiment 11 also gas mixtures of other compositions were used, for example, (A) 80% by volume of argon+15% by volume of carbon dioxide+5% by volume of oxygen, (B) 95% by volume of carbon dioxide+5% by volume of oxygen and (C) 90% by volume of carbon dioxide +10% by volume of oxygen. In this case the quantity of gas was approximately 20 litres per minute.

Welds obtained with a welding electrode according to the invention are in general characterized by a very smooth, even appearance. The flow of the welding metal against the metal of the workpiece is very good. Excellent fillet welds in the horizontal vertical position are obtained with welding electrodes according to the invention; the welding electrodes are particularly suitable for making welds in the overhead position. During welding little or no spattering occurs.

Particularly good results in this respect were obtained with welding electrodes of the experiments 7, 11, 18 and 21 and more in particular with those of experiment 10.

TABLE

| Experiment no. | Elements of the core | | | | | | |
|---|---|---|---|---|---|---|---|
| | Fe | Mn | Si | TiO$_2$ | K$_2$O | SiO$_2$ | Al$_2$O$_3$ |
| 1 | 22 | 1.45 | 0.8 | 4.5 | 0.5 | | |
| 2 | 21 | 1.45 | 0.8 | 4.0 | 1.0 | | |
| 3 | 20 | 1.45 | 0.8 | 3.5 | 1.5 | | |
| 4 | 20 | 1.45 | 0.8 | 2.5 | 2.5 | | |
| 5 | 21 | 1.45 | 0.8 | 2.0 | 2.0 | | |
| 6 | 23 | 1.45 | 0.8 | 4.5 | 0.52 | 0.09 | 0.09 |
| 7 | 23 | 1.45 | 0.8 | 4.0 | 0.82 | 0.09 | 0.09 |
| 8 | 22 | 1.45 | 0.8 | 3.5 | 1.32 | 0.09 | 0.09 |
| 9 | 21 | 1.45 | 0.8 | 3.0 | 1.82 | 0.09 | 0.09 |
| 10 | 21 | 1.45 | 0.8 | 2.5 | 2.32 | 0.09 | 0.09 |
| 11 | 22 | 1.45 | 0.8 | 3.0 | 1.65 | 1.17 | 0.18 |
| 12 | 20 | 1.45 | 0.8 | 2.5 | 2.15 | 0.17 | 0.18 |
| 13 | .20 | 1.45 | 0.8 | 2.0 | 2.65 | 0.17 | 0.18 |
| 14 | 22 | 1.45 | 0.8 | 3.0 | 1.47 | 0.25 | 0.28 |
| 15 | 20 | 1.45 | 0.8 | 2.5 | 1.97 | 0.25 | 0.28 |
| 16 | 20 | 1.45 | 0.8 | 2.0 | 2.47 | 0.25 | 0.28 |
| 17 | 20 | 1.45 | 0.8 | 2.0 | 2.30 | 0.34 | 0.36 |
| 18 | 17 | 1.45 | 0.8 | 4.8 | 2.64 | 0.27 | 0.29 |
| 19 | 22 | 1.45 | 0.8 | 2.5 | 2.34 | | 0.10 |
| 20 | 23 | 2.15 | 0.4 | 3.0 | 1.65 | 0.17 | 0.18 |
| 21 | 21 | 1.05 | 1.25 | 3.0 | 1.82 | 0.09 | 0.09 |
| 22 | 20 | 1.45 | 0.6 | 2.5 | 0.15 | 0.17 | 0.18 |
| 23 | 23 | 1.45 | 0.8 | 3.0 | 1.82 | 0.09 | 0.39 |
| 24 | | 1.20 | 1.115 | 2.5 | 1.97 | 0.25 | 0.28 |

What is claimed is:

1. A welding electrode particularly adapted for the welding under a protective gas of an iron workpiece, said electrode comprising an outer metal shell and an inner core, said electrode consisting essentially of iron and containing manganese and a reducing metal selected from the group consisting of silicon, titanium and zirconium and containing in the core a slag-forming mineral constituent containing titanium dioxide and silicon dioxide in the ratio of 10:1 to 1:1.5 by weight, the combined total content of the titanium dioxide and the silicon dioxide being at least 3.5% by weight of the electrode and the maximum content of the mineral constituent being 9% by weight of the electrode.

2. The welding electrode of claim 1, wherein the ratio of the quantities by weight of titanium dioxide and silicon dioxide present in the mineral constituent of the core lies between about 5:1 and 1:1.5.

3. The welding electrode of claim 2 wherein the ratio of the quantities by weight of titanium dioxide and silicon dioxide present in the mineral constituent of the core lies between about 2:1 and 1:1.

4. The welding electrode of claim 1, wherein the mineral constituent of the core is 5–8% by weight of the welding rod.

5. The welding electrode of claim 1 wherein the mineral constituent of the core contains an alkali oxide and the ratio of the quantities by weight of silicon dioxide to the alkali oxide exceeds 2.3.

6. The welding electrode of claim 5 wherein potassium oxide is used as the alkali oxide.

7. The welding electrode of claim 5 wherein the mineral constituent of the core also contains aluminum oxide and the ratio of the quantity by weight of the silicon dioxide to that of alkali oxide and aluminum oxide together exceeds 2.3.

8. The welding electrode of claim 5, wherein the alkali oxide and aluminum oxide and part of the silicon dioxide used in the mineral constituent of the core is added in the form of an alkali.

9. In a method of welding iron workpieces by an electric arc in a protective gas atmosphere the improvement which comprises employing as the welding electrode the electrode of claim 1.

References Cited

UNITED STATES PATENTS 2,951,931  9/1960  Danhier _____ 219—146

RICHARD M. WOOD, *Primary Examiner.*

B. A. STEIN, *Assistant Examiner.*

UNITED STATES PATENT OFFICE
CERTIFICATE OF CORRECTION

Patent No. 3,405,248                                                  October 8, 1968

Wilhelmus Gerardus Essers et al.

It is certified that error appears in the above identified patent and that said Letters Patent are hereby corrected as shown below:

Column 4, in the TABLE, seventh column, line 11 thereof, "1.17" should read -- 0.17 --; same TABLE, fourth column, line 24 thereof, "1.115" should read -- 1.15 --.

Signed and sealed this 17th day of March 1970.

(SEAL)
Attest:

Edward M. Fletcher, Jr.                            WILLIAM E. SCHUYLER, JR.
Attesting Officer                                            Commissioner of Patents